(12) United States Patent
Nucci et al.

(10) Patent No.: US 8,046,496 B1
(45) Date of Patent: Oct. 25, 2011

(54) SYSTEM AND METHOD FOR NETWORK DATA COMPRESSION

(75) Inventors: Antonio Nucci, San Jose, CA (US); Supranamaya Ranjan, Palo Alto, CA (US); Su Chen, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 865 days.

(21) Appl. No.: 11/955,259

(22) Filed: Dec. 12, 2007

(51) Int. Cl.
*G06F 15/16* (2006.01)
*H04J 3/18* (2006.01)

(52) U.S. Cl. .................. 709/247; 709/246; 370/477

(58) Field of Classification Search ........... 709/246, 709/247; 370/464–466, 477
See application file for complete search history.

(56) References Cited

U.S. PATENT DOCUMENTS

| | | | | |
|---|---|---|---|---|
| 6,768,716 | B1 * | 7/2004 | Abel et al. | 370/230 |
| 7,032,072 | B1 * | 4/2006 | Quinn et al. | 711/118 |
| 7,385,924 | B1 * | 6/2008 | Riddle | 370/235 |
| 7,420,992 | B1 * | 9/2008 | Fang et al. | 370/477 |
| 7,558,290 | B1 * | 7/2009 | Nucci et al. | 370/477 |
| 7,610,330 | B1 * | 10/2009 | Quinn et al. | 709/201 |
| 7,649,909 | B1 * | 1/2010 | Archard et al. | 370/477 |
| 7,664,048 | B1 * | 2/2010 | Yung et al. | 370/253 |
| 2005/0192994 | A1 * | 9/2005 | Caldwell et al. | 707/101 |
| 2006/0095588 | A1 * | 5/2006 | Van Lunteren | 709/246 |

OTHER PUBLICATIONS

Buchsbaum, A. et al., "Engineering the Compression of Massive Tables: An Experimental Approach," in: Proceedings of the Eleventh Annual ACM-SIAM Symposium on Discrete Algorithms (Jan. 9-11, 2000), pp. 175-184.
Jagadish, H.V. et al., "ItCompress: An Iterative Semantic Compression Algorithm," in: Proceedings of the 20th International Conference on Data Engineering (ICDE) (Mar. 30-Apr. 2, 2004), pp. 646-657.
Jagadish, H.V. et al., "Semantic Compression and Pattern Extraction with Fascicles," in: Proceedings of the 25th International Conference on Very Large Data Bases (Sep. 7-10, 1999), pp. 186-198.

\* cited by examiner

*Primary Examiner* — Saleh Najjar
*Assistant Examiner* — Tae Kim
(74) *Attorney, Agent, or Firm* — Fernandez & Associates, LLP

(57) ABSTRACT

The present invention relates to a method of compressing data in a network, the data comprising a plurality of packets each having a header and a payload, the header comprising a plurality of header fields, the method comprising generating a classification tree based on at least a portion of the plurality of header fields, determining a inter-packet compression plan based on the classification tree, and performing inter-packet compression in real time for each payload of at least a first portion of the plurality of packets, the inter-packet compression being performed according to at least a portion of the inter-packet compression plan.

16 Claims, 8 Drawing Sheets

SYSTEM AND METHOD FOR NETWORK DATA COMPRESSION

BACKGROUND OF THE INVENTION

1. Field of the Invention

The present invention relates to computers and computer networks. More particularly, the invention relates to compressing data in a network.

2. Background of the Related Art

Recent years have witnessed a sudden increase in Internet Service Provider's (ISP's) demand of content-rich traffic information to enable novel IP applications such as real-time marketing, traffic management, security and lawful Intercept (i.e. Internet surveillance), etc. Typically, such applications are hosted at a centralized processing center to which the traffic data is transferred for further processing. Thus, raw traffic and/or meta-data events exported from the monitoring stations to the central processing center compete heavily for network bandwidth with applications being used by commercial ISP's customers. At the same time, carriers have manifested clearly a strong desire not to just collect and analyze traffic, but also to store the exported information for analyzing trends of application usage and user behavior over time. This information is useful for understanding the popularity of a specific IP application or service over time, trends of security vulnerabilities being exploited, etc. More recently, carriers have been asked by government agencies to store specific data for many years in their facilities before getting discarded. An example of such requirement related to data retention, which requires layer-4 information and key packet payload information to be stored for all carrier's customers. All the above translates into huge storage requirements for carriers, for example TCP/IP header collected in an hour on a 10 Gb/s link can easily require 3 Terabytes of storage capacity.

Despite the development and advancement of the data compression techniques (e.g., Gzip, Bzip, Pzip, Fascicle, ItCompress, Spartan, TCP/IP header compression techniques, etc.) developed for data base application and network traffic application, there remains a need to provide techniques to achieve high compression ratio for lossless real-time data compression for network traffic data and even higher compression ratio for network archive data. It would be desirable that such technique can utilize the same algorithm for both online compression of real-time traffic data and offline compression of archive data, analyze internal structure of network data to improve real-time compression ratio, determine the compression plan based on a offline training procedure, and apply the compression plan to both header and payload of the network data packets.

SUMMARY

In general, in one aspect, the present invention relates to a method of compressing data in a network, the data comprising a plurality of packets each having a header and a payload, the header comprising a plurality of header fields, the method comprising generating a classification tree based on at least a portion of the plurality of header fields, determining a inter-packet compression plan based on the classification tree, and performing inter-packet compression in real time for each payload of at least a first portion of the plurality of packets, the inter-packet compression being performed according to at least a portion of the inter-packet compression plan.

In general, in one aspect, the present invention relates to a method of compressing data in a network, the data comprising a plurality of packets each having a header and a payload, the header comprising a plurality of header fields, the method comprising generating a classification tree based on at least a portion of the plurality of header fields, determining a inter-packet compression plan based on the classification tree, performing inter-packet compression in real time for each payload of at least a first portion of the plurality of packets, the inter-packet compression being performed according to at least a portion of the inter-packet compression plan, and performing intra-packet compression in real time for each header of at least a second portion of the plurality of packets, the intra-packet compression being performed according to a predetermined intra-packet compression plan.

In general, in one aspect, the present invention relates to a method of compressing data in a network, the data comprising a plurality of packets each having a header and a payload, the header comprising a plurality of header fields, the method comprising generating a classification tree based on at least a portion of the plurality of header fields, performing data compression according to a compression plan, the compression plan being based on the classification tree, comparing a cumulative compression ratio and a pre-determined threshold to generate a result, and adjusting the compression plan according to the result.

In general, in one aspect, the present invention relates to a computer readable medium, embodying instructions executable by the computer to perform method steps for compressing data in a network, the data comprising a plurality of packets each having a header and a payload, the header comprising a plurality of header fields, the instructions comprising functionality for generating a classification tree based on at least a portion of the plurality of header fields, determining a inter-packet compression plan based on the classification tree, and performing inter-packet compression in real time for each payload of at least a first portion of the plurality of packets, the inter-packet compression being performed according to at least a portion of the inter-packet compression plan.

In general, in one aspect, the present invention relates to a computer readable medium, embodying instructions executable by the computer to perform method steps for compressing data in a network, the data comprising a plurality of packets each having a header and a payload, the header comprising a plurality of header fields, the instructions comprising functionality for generating a classification tree based on at least a portion of the plurality of header fields, determining a inter-packet compression plan based on the classification tree, performing inter-packet compression in real time for each payload of at least a first portion of the plurality of packets, the inter-packet compression being performed according to at least a portion of the inter-packet compression plan, and performing intra-packet compression in real time for each header of at least a second portion of the plurality of packets, the intra-packet compression being performed according to a predetermined intra-packet compression plan.

In general, in one aspect, the present invention relates to a computer readable medium, embodying instructions executable by the computer to perform method steps for compressing data in a network, the data comprising a plurality of packets each having a header and a payload, the header comprising a plurality of header fields, the instructions comprising functionality for generating a classification tree based on at least a portion of the plurality of header fields, performing data compression according to a compression plan, the compression plan being based on the classification tree, comparing a cumulative compression ratio and a pre-determined threshold to generate a result, and adjusting the compression plan according to the result.

DETAILED DESCRIPTION

Figure 1:
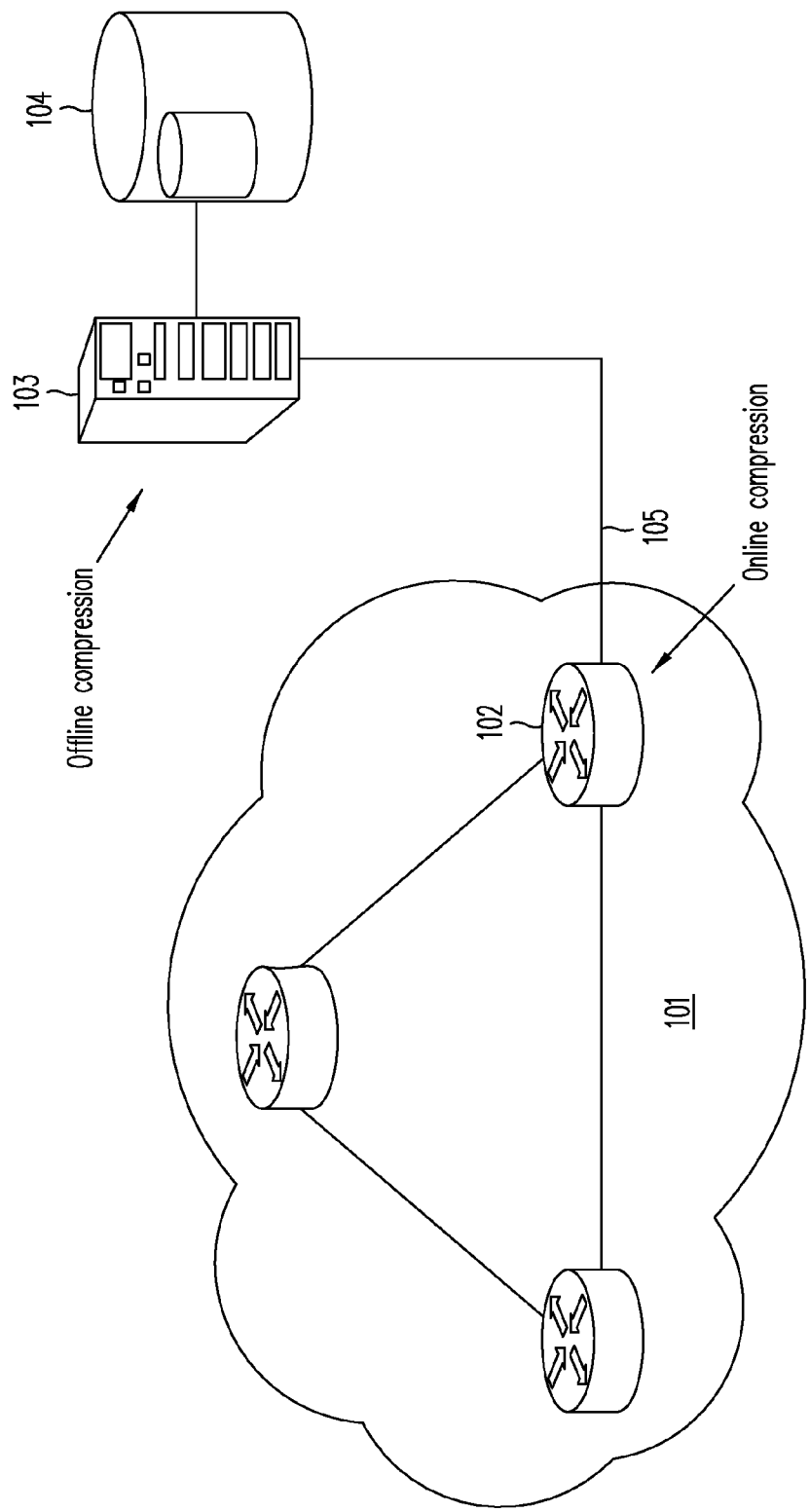
FIG. 1 shows a system architecture diagram for data compression in a network according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Aspects of the invention relates to data compression for a network where the data typically composes of multiple data packets in real-time traffic through network nodes. The data packets of the real-time traffic may also be archived in data repositories of the network for evaluation or other purposes. Each data packet may include a header portion containing control information and a payload portion containing the actual content. The header may include various fields such as source IP address, destination IP address, source port An example of the network is a TCP/IP network. The TCP/IP network data model represents the network data in five layers including the Application layer (carrying application data), the Transport layer (carrying e.g., UDP datagram consisting of UDP header and UDP data), the Network layer (carrying e.g., IP packet consisting of IP header and IP data), the Data link layer (carrying e.g., frame header, frame data, and frame footer), and the Physical layer. In other examples, the OSI model may be used to represent the network data in seven layers including the Application layer (or layer 7), the Presentation layer (or layer 6), the Session layer (or layer 5), the Transport layer (or layer 4), the Network layer (or layer 3), the Data link layer (or layer 2), and the Physical layer (or layer 1). The Application layer (or layer 7), the Presentation layer (or layer 6), and the Session layer (or layer 5) of the OSI model roughly correspond to the Application layer of the TCP/IP model. Many other variations of layered network data model may also be implemented in a high speed network. In this paper, examples are given for compression of the layer-7 (i.e., the Application layer) data. However, one skilled in the art will appreciate that the invention may be applied to other layers of the network data model described above or other variations of the network data model.

FIG. 1 shows a system architecture diagram for data compression in a network. Here, the network (101) may include multiple nodes such as the node (102). The node (102) may be a network router, which may include multiple links such as the link (105). The link (105) may carry real-time data traffic in the form or multiple data packets (not shown). The network (101) may also be configured with a data center (103), which may include a data repository (104). Portions of the real-time data traffic may be stored in the data repository (104) for evaluation or regulatory purposes. The node (102) may be configured with online data compression capability for performance purpose. The data center (103) may be configured with offline data compression capability for storage capacity purpose. The current invention may be applied to use the same algorithm for both the online compression and the offline compression.

Figure 2:
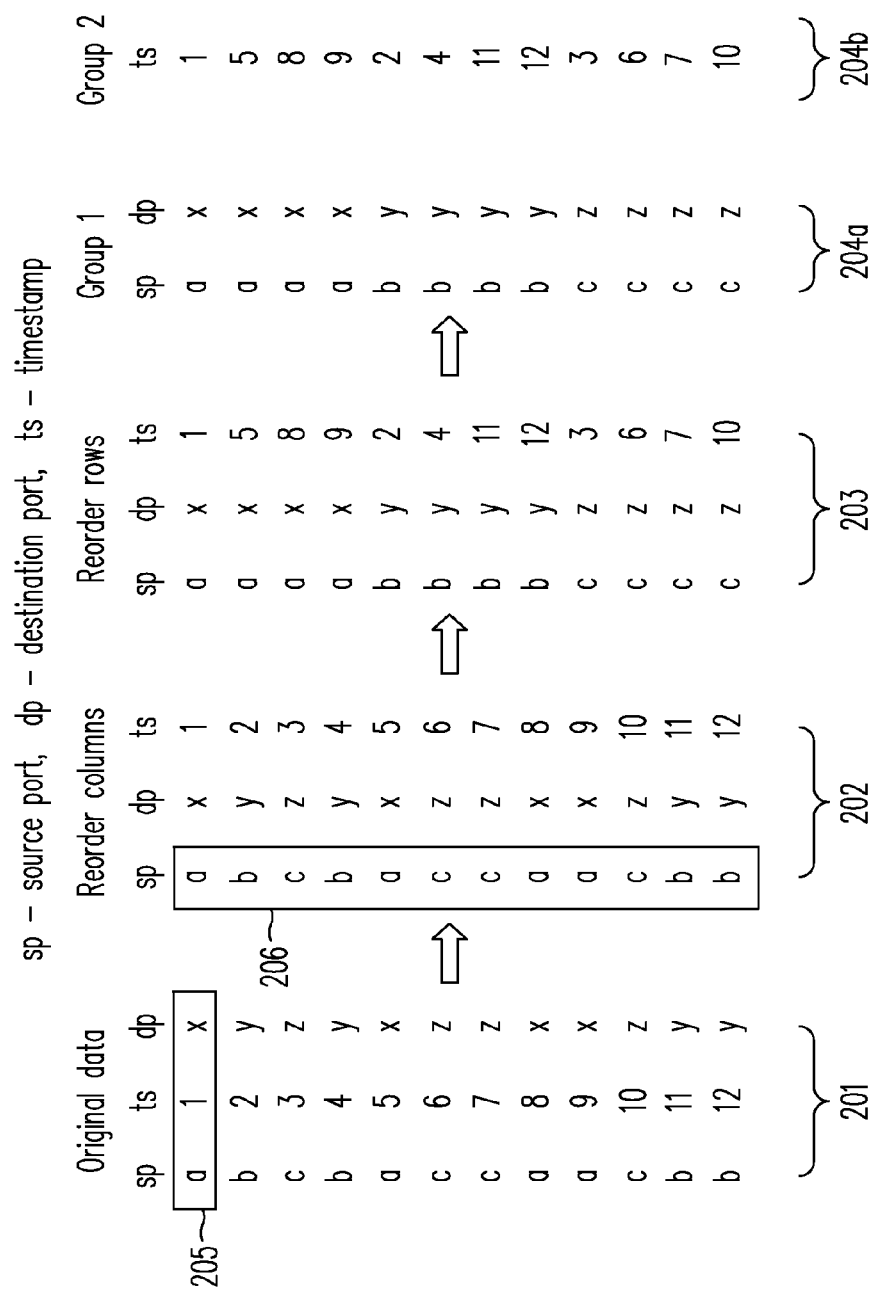
FIG. 2 shows an example of data compression according to aspects of the invention.

FIG. 2 shows an example of data compression according to aspects of the invention. Here, real-time network data packets are represented in multiple rows (e.g., (205)) of a matrix (201) in the order as they may arrive at a link (e.g., (105) in a network (e.g., (101)). In the example shown in FIG. 2, only certain fields in a data packet are shown in each row. For example, only source port (sp), time stamp (ts), and destination port (dp) fields are shown in row (205) and all other rows of the data packets (201). The source port, time stamp, and destination port fields in the data packets may be of various different sizes depending on the network data model. The source port, time stamp, and destination port fields in row (205) are shown to have values "a", "1", and "x", respectively.

As shown in FIG. 2, the columns (e.g., (206)) of data packets (201) may be reordered based on observed correlation to form a matrix (202) having multiple rows. As the reorder results in changes within each packet, this correlation is called intra-packet correlation in this paper. Furthermore, the rows of the matrix (202) may also be reordered based on observed correlation to form a matrix (203). As the reorder results in changes in the order of data packets in the matrix (202) from that of (201), this correlation is called inter-packet correlation in this paper. Finally, the matrix (203) may be clustered into group 1 (204a) and group 2 (204b) for separate compression. More details in analyzing the intra-packet correlation, inter-packet correlation, and clustering are given in the various examples below.

Figure 3:
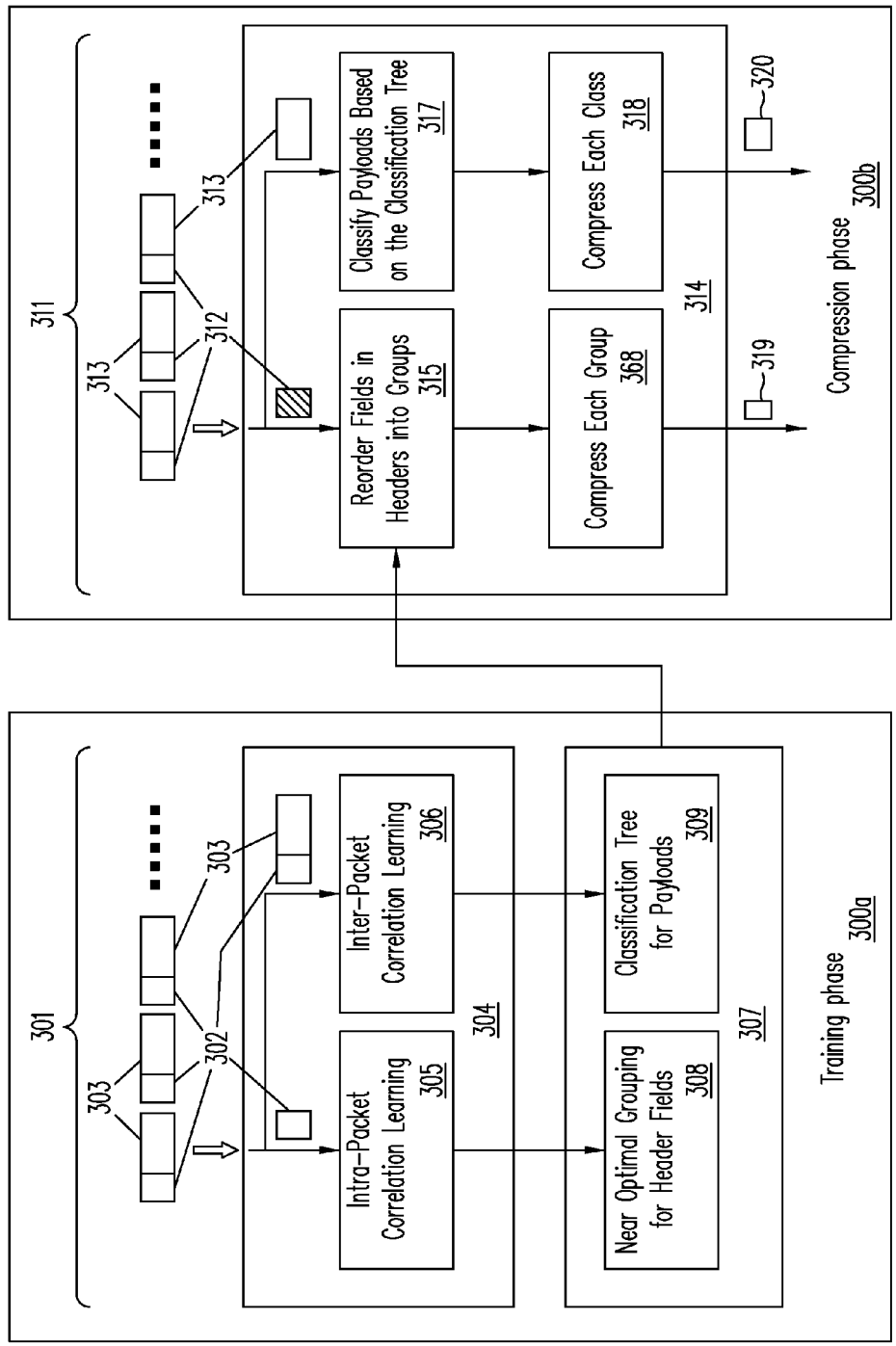
FIG. 3 shows a schematic diagram of a data compression flow according to aspects of the invention.

FIG. 3 shows a schematic diagram of a data compression flow according to aspects of the invention. The data compression is performed in a training phase (300a) and a compression phase (300b). Training data (301), preferably from historical network data in a consecutive timing window with similar traffic pattern to target traffic for compression, may be used to determine, establish, or otherwise generate a compression plan (307) in the training phase (300a). Real-time data (311) may then be compressed based on the compression plan (307) in the compression phase (314).

In the training phase (300a), the compression plan (307) may be determined based on correlation learning algorithm (305) for analyzing the training data (301). The training data (301) may comprise data packets having headers (302) and payload (303). The headers (302) may be used for intra-packet correlation learning algorithm (305) to analyze correlation among the different fields in the header structure. A near optimal grouping for header fields (308) may be generated as a portion of the compression plan (307) based on the intra-packet correlation learning algorithm (305). The payload (303) may be used for inter-packet correlation learning algorithm (306) to analyze correlation among the different packets in payload (e.g., based on corresponding header attributes). A classification tree for payloads (309) may be generated as a portion of the compression plan (307) based on the inter-packet correlation learning algorithm (306).

In the compression phase (300b), the compressed data (e.g., the compressed header (319) and compressed payload (320)) may be generated (or compressed) separately from the real-time data (311) based on the compression module (314). The real-time data (311) may comprise data packets having headers (313) and payload (312). The headers (313) and payload (312) may have same or similar structure as the headers (303) and payload (302). The fields in the headers (312) may be reordered into groups based on the near optimal grouping (308) in the compression plan (307). The groups may then be compressed separately (368) to generate the compressed headers (319). The payloads (313) may be classified into categories based on the classification tree (309) in the compression plan (307). The categories may then be compressed separately (320) to generate the compressed payloads (320).

The compression plan (307) learned from training set may be used for both online and offline compression. In some examples of online compression, the inter-packet correlation may be applied only to payloads and based on only a portion of the classification tree (309) for the following reasons. First, applying both inter-packet and intra-packet compression plan may be too expensive considering the resources required. The number of compressors need for intra-packet compression plan is determined by the number of groups learned by the training phase, which is typically 50 or less (as there are only 40 bytes in a TCP header). In comparison, the compressors needed for inter-packet compression plan is determined by the number of classes in the classification tree, which is typically several hundreds or less. These requirements may be affordable in modern routers. However if both intra-packet compression plan and inter-packet compression plan are applied, up to 50 times several hundreds compressors may be required. Applying the inter-packet compression plan only to the payloads (not the headers) based on a portion of the classification tree may relieve the resource requirement for performing the compression. For example, top 2 layers of the classification tree may be converted into a hash table and dynamically maintained without requiring excessive computing resources.

In addition, it may be too time consuming to apply inter-packet correlation to headers for online decompression. Inter-packet compression plan may assign the headers to different classes. As a result, the order of original packets may not be preserved after compression. Therefore, the packets need to be sorted based on timestamp during decompression to recover the original order, however sorting takes time. Thus it may be difficult to perform online decompression as fast as online compression.

The compressor resource and compression time constraints may be resolved in offline compression with more resources such as CPU power and memory. Both the intra-packet compression plan the inter-packet compression plan may be applied to headers for offline compression. Complete classification tree may also be used for payload compression for the offline cases.

The difference between an exemplary online and offline compression is summarized in table 1 below.

TABLE 1

|  | Online Compression | Offline Compression |
| --- | --- | --- |
| Header Compression | Use only intra-packet compression plan One compressor for each group | Use both intra- and inter-packet compression plan Generate groups first, then compress them one by one with one compressor |
| Payload Compression | Use top 2 layers of inter-packet compression plan One compressor for each class | Use whole inter-packet compression plan Generate classes first, then compress them one by one with one compressor |

As described in various network data models known in the art, network data can be viewed as a tuple with structured data and unstructured data. For example, network packet data may be represented as a tuple <header, payload> with header as the structured portion and payload as the unstructured portion. The structured data denoted by T can be viewed as a table with header fields defining the columns and packets defining the rows (e.g., the matrix (201) of FIG. 2). The unstructured data denoted by S can be viewed as a single column table with each row representing a variable size payload. For some special cases, only structured portion are collected, which can be viewed as a special case with length of its unstructured portion equals 0. For a network data set represented as tuple <T, S>, <T[i], S[i]> may be used to represent the ith packet in this data set. In many examples, the compression of structured portion T and unstructured portion S may be performed separately due to the structure and content dissimilarities between them.

As an example, the compression problems may be defined as problem 1 of compression based on intra-packet correlation and problem 2 of inter-packet correlation, which are formally described below.

Problem 1: Compression Based on Intra-Packet Correlation

Let T be the structured data need to be compressed. T has n columns. For a given compressor C, let C(T) be the compressed bytes of T. The goal is to divide the columns into $G_1, \ldots, G_{\bar{K}}$ groups. Each group $G_i$ contains $k_i$ columns $T=\cup_{i=1}^{\bar{K}} G_i$, and $\Sigma_{i=1}^{\bar{K}} k_i=n$, so that the compressed side $C(T)=\Sigma_{i=1}^{\bar{K}} C(G_i)$ will be minimized.

The problem 1 may be reduced to finding the best column-wise partition of the data. At this time, it is imperative to point out that the definition of a column is independent of semantics. In other words, if a column is assumed to represent a byte, then a 4 byte ip-address would consist of 4 columns. It is not difficult to see that an algorithm that solves Problem 1 while assuming minimum granularity for a column to be a byte, would achieve an optimal solution. Because there is more similarity inside one group than between groups, the compressor compresses each group independently to improve compression ratio. Thus, there are multiple best answers such that if $\{G_1, \ldots, G_K\}$ is the best grouping, then any permutation of $\{G_1, \ldots, G_K\}$ will be the best grouping too. For purposes of compression only, it is not necessary to find all of them.

Problem 2: Compression Based on Inter-Packet Correlation

Let S={S[1], S[2], . . . , S[m]} be the unstructured data where m is the number of records or packet payloads. For a given compressor C, let C(S) be the compressed bytes of S. The goal is to divide S into $G_1, \ldots, G_{\bar{K}}$ groups. Each group $G_i$ contains $k_i$ of records, $S=\cup_{i=1}^{\bar{K}} G_i$, and $\Sigma_{i=1}^{\bar{K}} k_i=m$, so that the compressed size $C(S)=\Sigma_{i=1}^{\bar{K}} C(G_i)$ will be minimized.

The problem 2 may be reduced to finding the best reordering of all rows (i.e., payloads) such that a better compression may be achieved when similar rows are compressed together. It is not difficult to see that an algorithm that solves problem 2 finds the best reordering of rows that maximizes the compression ratio.

The following lemma describes more details about the problem 1 and problem 2.

Lemma 1: The complexity of finding best grouping is $O(n^2 n!)$ for problem 1, and $O(m^2 m!)$ for problem 2. Proof For Problem 1, we first compute permutations of all columns with complexity $O(n!)$, and then use dynamic programing to find the optimal partition of the columns for each permutation with complexity $O(n^2)$. So, the total cost is $O(n^2 n!)$. Similarly, Problem 2 can be solved by permutating all rows and applying dynamic programming to find best grouping of all rows. So the total cost is $O(m^2 m!)$.

The methods for find optimal solution for problem 1 and 2 are very similar. Problem 1 is used as an example here. The exhaustive search for optimal answer contains both finding the best ordering of the columns and finding the best partition. The following algorithm describes how to find the optimal solution.

$\mathcal{T} = \{T_i\}$ be a set tables of all possible ordering of columns in table T, i.e. columns in $T_i$ is a permutation of columns in T. Let Best[T,n] be the smallest compressed size of table T with n columns. Let $T_i^l$ be the subset of the left j columns in table $T_i$, and $T_i^r$ be the subset of the right n-j columns.

```
1:     𝒯 ← { }
2:     Generate all possible ordering of columns for
       table T, add them to 𝒯
3:     Best[T, n] ← +∞
4:     for every T_i ∈ 𝒯
5:         for (j = 1..n)
6:             Best[T, n] ← min(Best[T, n],
                 Best[T_i^l, j] + Best[T_i^r, n − j])
7:     return Best[T, n]
```

In this algorithm, there are n! possible permutations of all columns in table T, so the loop in line 4 will be excuted n! times. With dynamic programing, the smallest compressed size for every interval will be computed only once, and there are only $O(n^2)$ intervals for each $T_i$, so the complexity of finding its best grouping for $T_i$ is $O(n^2)$. As a result, the complexity of this algorithm is $O(n^2 n!)$. However, the cost for the optimal algorithm is too high for practical use and hence a near-optimal algorithm IPzip is introduced that learns the correlation pattern through a small training set, generates a compression plan, and then compresses the original data set according to the compression plan. This separation moves all the complexity to the training step, which can be taken offline so that the real-time online compression can still be done very fast. This holds true under the assumption that the training set represents the original data set, so that the near-optimal plan generated from training set may be an effective plan for the original data set.

IPzip Compression Plan Generation for Intra-Packet Correlation

IPzip's plan generation algorithm for structured data exploits the fact that packet headers contain certain highly compressible columns. For instance, the timestamp values for packet arrivals does not vary much across consecutive packets and hence is highly compressible. For such columns, differential encoding may be applied, which computes the difference of current data from previous data, to transfer them into a 0-dominated sequence and finally compress them separately. After removing these high-compressible columns, the computation cost for finding an effective compression plan for the remaining columns is reduced significantly. As for the low-compressible columns, an algorithm is described below.

The algorithm works as follows. Let U represent the set of low-compressible columns, whose cardinality is denoted by l. Given, a parameter k for the maximum group size, the algorithm generates all possible candidate groups, denoted as $\mathscr{G} = \{G_1, \ldots, G_k\}$, that contains 1 to k columns and then computes the compressed size for each of them. Let $|G_i|$ represent the size of the generic group $G_i \in \mathscr{G}$, i.e. the number of columns in $G_i$. Let the cost for each group $G_i$ be its compressed size, denoted as cost $(G_i)$. So, the problem is reduced to finding the best set of groups that covers all the l columns with mininum cost, denoted as $\mathscr{C}$. This is a well known NP-complete problem, called minimum set cover. We use Chvatal's greedy algorithm [4] to get an approximate answer. If OPT is the cost of the optimal coverage and $H_l$ is the l-th harmonic number, $$H_l = 1 + \frac{1}{2} + \frac{1}{3} + \ldots + \frac{1}{l} \approx \ln l,$$

then the cost of coverage found by the greedy algorithm is no worse than H(l)OPT.

Having identified the near-optimal group of columns, the algorithm enters the compression step. In this step, the low-compressible columns are arranged in the original data into groups found by the plan generation step, i.e. $\mathscr{C}$, and then the given compressor is applied to compress each group independently.

More details of the algorithm are shown as below.

```
Generate Grouping of Columns
1:     Initialize candidate group set 𝒢 ← { }
2:     For (i = 1..k) {
3:         Generate all combination of size i for l low compressible
           columns in U
4:         For each combination {
5:             Generate all i! permutations of columns inside this combination
6:             Add every generated permutation to 𝒢 } }
7:     Initialize chosen group set 𝒞 ← { }
8:     While 𝒞 does not cover all columns {
9:         Find G ∈ 𝒢 with minimum cost per column,
           cost(G)/|G| = min(cost(G_i)/|G_i|), ∀G_i ∈ 𝒢
10:        Add G to 𝒞, 𝒞 ← 𝒞 ∪ {G}
11:        Update candidate group set,
           ∀G_i ∈ 𝒢 if G_i ∩ G ≠ { }, 𝒢 ← 𝒢 − {G_i} }
13:    return 𝒞
COMPRESSION
1:     Reorganize columns as groups
2:     Compress each group independently
```

Note that to avoid compressing the same column several times in different groups, all groups overlapping with the chosen group (i.e., containing some columns that are covered by the chosen group) are removed from the candidate set (see line 11). This does not change the algorithm, since all groups from size 1 through k are generated. All candidate groups needed for the left uncovered columns will not be removed by removing those overlapped groups.

This algorithm is not optimal, even if k=n, since (1) the greedy algorithm finds an approximation of optimal solution and (2) the best grouping for the training set may not be the best one for original set. However in practice, this sub-optimal grouping with k<n can be very efficient, because the number of correlated columns is limited even in data sets with large number of columns. For example, the port number may be correlated with layer 7 application, but not layer 2 protocol. In rare cases, all n columns need to be explored to find the correlated ones.

The complexity of this algorithm is bounded by $\Sigma_{i=1}^{k} i! C_l^i = \Sigma_i P_l^i = O(l^k)$, because there are total $\Sigma_{i=1}^{k} i! C_l^i$ number of candidate groups generated. The complexity of finding the minimum set coverage is $O(l^k)$ too, because at each step, there must be at least one column added to C, so the loop at line 8 runs at most l times. With one column covered, the number of candidate groups will be reduced from $O(l^k)$ to $O((l-1)^k)$, and with j columns covered, the candidate group size is only $O((l-j)^k)$ $. So, the total number of times the candidate groups are visited to find the minimum cost coverage is $O(l^k) + O((l-1)^k) + \ldots + O(1^k) = O(l^k)$.

As can be seen from above, if l is large, the plan generation complexity is large. Hence, in IPzip, this step is done offline and the learnt compression plan can then be applied against the actual traffic data in real time.

IPzip Compression Plan Generation for Inter-Packet Correlation

Recall the optimal solution would require reordering all the packets and has a super-exponential complexity in terms of the number of payloads ($O(m^2 m!)$). Furthermore, it only returns a optimal ordering of rows, thus a optimal solution from the training data can not be used on whole data set. Thus, a near-optimal algorithm is introduced that returns a set of rules that describe how to reorder payloads instead of actual ordering. The algorithm is based on the observation that a packet's payload is typically correlated with its header. For instance, port number in header indicates the application corresponding to the payload, for example port 80 in the header can be expected to be correlated with the appearance of the string "http" in the payload. Moreover, IPzip exploits the behavior of compressors such as Gzip that are based on the lempel-ziv algorithm, which achieve a good compression ratio when the neighboring bits in the input data stream are highly correlated. Thus, the packet payloads that are correlated to each other such as those that correspond to the same destination port, should all sent to the same compressor.

The compression plan generation algorithm classifies all the payloads in the training data set in to multiple groups, where each group is then compressed via a separate compressor (e.g., Gzip). The information in headers T may be used to generate the best compression plan for the payloads S. In practice, some fields in T contain little or no information for classification, for example timestamp field in network flow data. Thus, excluding these fields from training can reduce the training time and the classification tree size. F is defined to be the fields in T that are related to S, $F = f_1, f_2, \ldots f_n$. A simple solution to classify the payloads would be to construct a full classification tree, where every possible value of every field is enumerated in the tree structure.

Figures 4A, 4B:
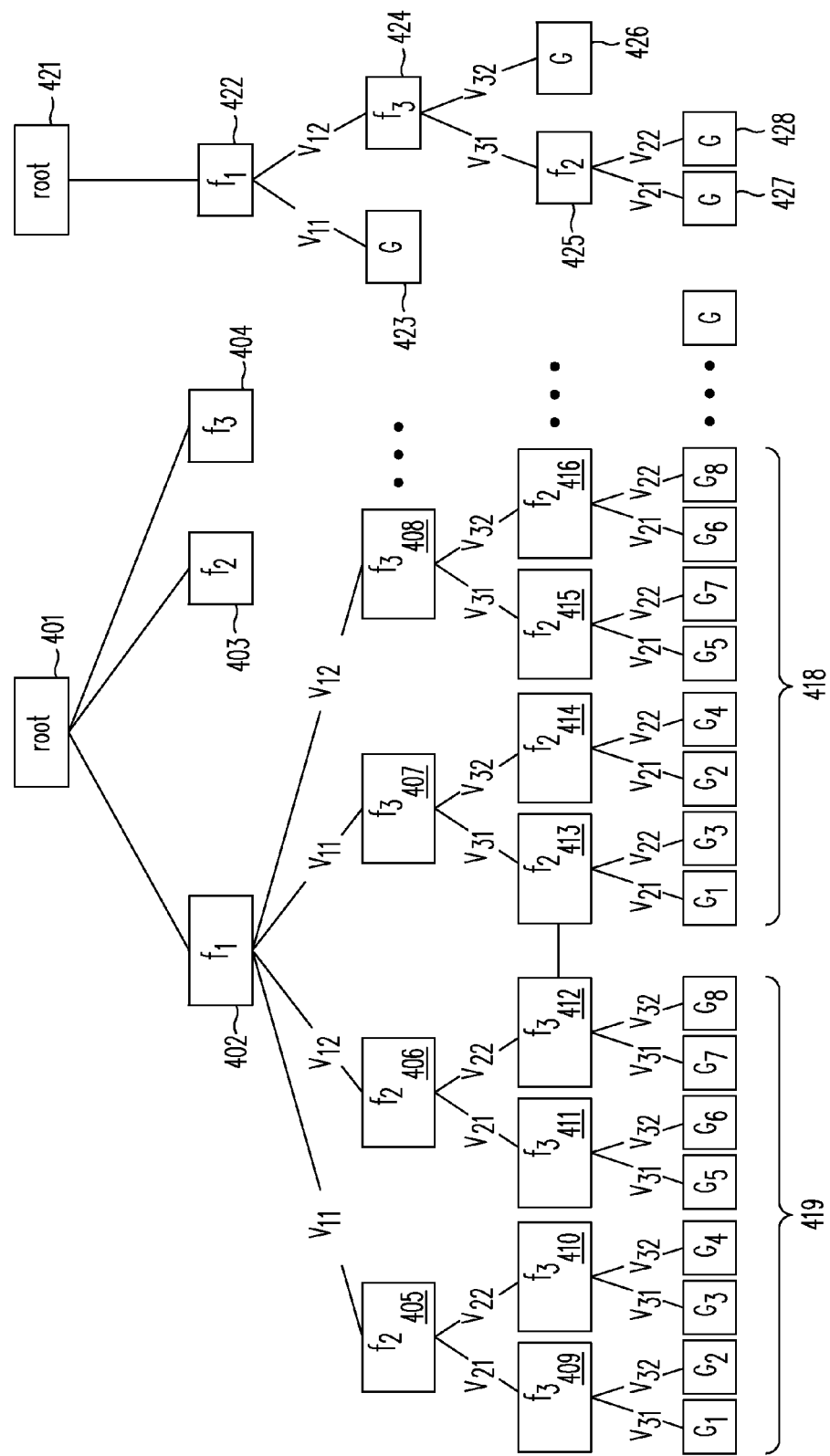
FIG. 4A shows a tree structure of a collection of network data packets according to aspects of the invention.
FIG. 4B shows a classification tree based on selected fields of a network data packet according to aspects of the invention.

FIG. 4A shows an exemplary full classification tree with each node (e.g., $G_1$ through $G_8$ of (419), (418), etc.) representing a group of payloads. In this example, F comprises 3 fields ($f_1, f_2, f_3$) with each field $f_i$ having 2 possible values $v_{i1}$, $v_{i2}$. A record S[i] may be assigned to each group (i.e., each leaf node in the tree) based on the field values in its associated F[i]. For example, each packet in the entire data set represented by root (401) may be classified first according to the values ($v_{i1}, v_{i2}$) in any of the three fields in the step (402), (403), or (404). The classified intermediate categories may then be further classified according to the values ($v_{i1}, v_{i2}$) of either of the remaining two fields in step (405), (406), (407), (408), etc. The further classified intermediate categories may then be again classified according to the values ($v_{i1}, v_{i2}$) of the last remaining field in step (409), (410), (411), (412), (413), (414), (415), (416), etc.

It can be seen that several paths lead to same group. For example, $G_2$ can be reached from path $f_1 \xrightarrow{v_{i1}} f_2 \xrightarrow{v_{i1}} f_3 \xrightarrow{v_{i2}} G_2$ or $f_1 \xrightarrow{v_{i1}} f_3 \xrightarrow{v_{i1}} f_2 \xrightarrow{v_{i2}} G_2$. A brute force classification can take all fields one by one and enumerate all values for each field. The sub-tree under root$\rightarrow f_1$ in FIG. 4A is an example. However compression based on this full classification tree may not be the best solution. First, enumeration of all values for all fields is too expensive. For example, there are $2^{32}$ possible ip addresses. Second, classifying via all the fields may not achieve the best compression. To the contrary, for some groups that have very few records, it may be better to combine them with their sibling groups or parents to achieve a better compression ratio. This is because lempel-ziv based compressors need a large amount of data to achieve a good compression ratio. If a group does not contain enough data, it may be more effective to either wait for more data, or compromise the compression ratio.

Thus, IPzip uses a greedy solution to build a classification tree, which may not necessarily be a complete tree including all fields in the data packet. Let the tree node represent the group of payloads that been classified to it by the fields and their values from root to itself, where root represent the entire data set. cost(node) is defined to be the compressed size of the this node, and Path(node) is the set of fields along the path from root to the node, then F-Path(node) would be the set of fields not yet used in the classification of node. This algorithm starts to find the best classification field that minimize the cost of root by trying all used fields, then classify the root into sub-groups/sub-nodes according to this best field. Then repeat above procedure for each sub-node until the cost can not be minimized anymore.

The algorithm for constructing the classification tree is described below where Q is the queue of tree nodes need to be explore. An example of such tree is showed in FIG. 4B where root (421) is first classified according to the values ($v_{i1}, v_{i2}$) in the field $f_1$ in step (422) into category (423) and an intermediate category, which is further classified according to the values ($v_{i1}, v_{i2}$) in the field $f_3$ in step (424) into category (426) and an intermediate category, which is still further classified according to the values ($v_{i1}, v_{i2}$) in the field $f_2$ in step (425) into categories (427) and (428).

Build the Classification Tree
```
1:    Q ← root
2:    while Q is not empty {
3:      node ← first node in Q; minlen ← cost(node)
5:      f_chosen ← NULL
6:      for every f ∈ F - Path(node) {
7:        further classify node to node_1, node_2, ... according to f's value
8:        newlen ← Σ_i cost(node_i)
9:        if minlen > newlen
10:          f_chosen ← f; minlen ← newlen }
11:     if f_chosen = NULL
12:       mark node as leaf
13:     else
14:       add node_1, node_2, ... to Q}
COMPRESSION
1:    for each S[i] {
2:      find its group, i.e., the leaf node can be reached
3:        from the fields in its T[i] }
4:    compress each group individually
```

As discussed above, the order of fields along the path is not important if full classification is used since the same leaf nodes will be generated, just in different order. However, in IPzip's classification tree generation, the tree is trimmed and hence the order of fields makes a difference.

The following lemma describes more details of the algorithm.

Lemma 2: IPzip's classification tree generation algorithm achieves the best order of fields used in classification. Proof At step 0, the only leaf node is the root. The algorithm chooses the field $f_{i_k}$ that leads to the smallest compression size to classify the whole data set as described in the algorithm.

Assume at step k, we had the best order of fields of $f_{i_1}$, $f_{i_2}, \ldots, f_{i_k}$ for reaching the leaf nodes at level k.

At step k+1, the algorithm expands one of the leaf nodes at level k as a root of a subtree and the algorithm finds the best field $f_{i_{k+1}}$ for this subtree. Suppose $f_{i_1}, f_{i_2}, \ldots, f_{i_k}, f_{i_{k+1}}$ is not the best path for a node at level k+1. There must be at least a $f_j \in f_{i_1}$, $f_{i_2}, \ldots, f_{i_k}$ that does not belong to the best path, since $f_{i_{k+1}}$ is the best path for the subtree at level k. However, this violates the assumption that $f_{i_1}, f_{i_2}, \ldots, f_{i_k}$ is the best path for reaching the node at level k.

For offline compression of packet payloads, the algorithm can train on the entire data set and build the classification tree that will achieve the best compression for the data set. However, for online compression, the classification tree is learnt on a sample training set which may not contain all values possible for all the fields. Hence, for each field, a value "other" is added to represent the values not covered for that field in the training set.

Those skilled in the art will appreciate that the IPzip example described above is generic in its definition of compression for unstructured data. Using all the fields in a packet header for building the classification tree would provide a per-packet compression. On the other hand, using only the fields that define a layer-4 flow (e.g., source ip-address, destination ip-address, source port, destination port and layer-4 protocol) would achieve a per-flow compression.

Figure 5A:
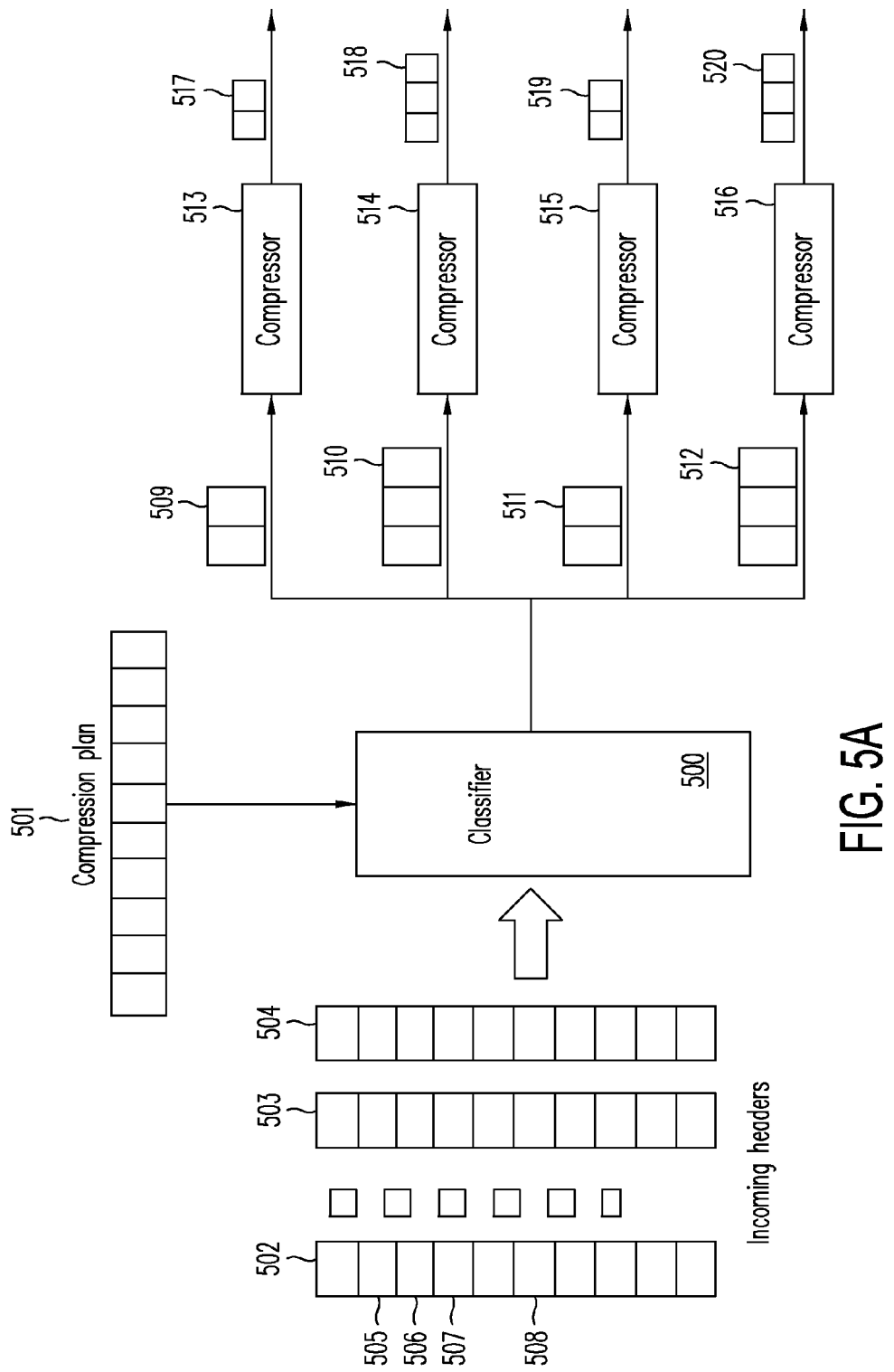
FIG. 5A shows a schematic diagram of a data compression flow based on a compression plan according to aspects of the invention.

FIG. 5A shows a schematic diagram of a data compression flow based on a compression plan depicting the example of headers being compressed in an online compression case. As shown in FIG. 5A, the classifier (500) rearranges the order of the columns (e.g., (502), (503), (504), etc.) of incoming traffic packets (e.g., (505), (506), (507), (508) etc.) according to the compression plan (501), which identifies the high/low compressible columns and how low compressible columns should be grouped together for compression. The classifier (500) sends each group (e.g., (509), (510), (511), (512), etc.) to respective compressors (e.g., (513), (514), (515), (516), etc.). For high compressible columns, the corresponding compressors may apply differential encoding, which generates 0 dominated columns, then compress them, for example by Gzip. For low compressible columns, the compressors may apply the compressor (e.g., Gzip) directly. Accordingly, the compressed headers (e.g., (517), (518), (519), (520), etc.) may be generated as shown in FIG. 5A.

Figure 5B:
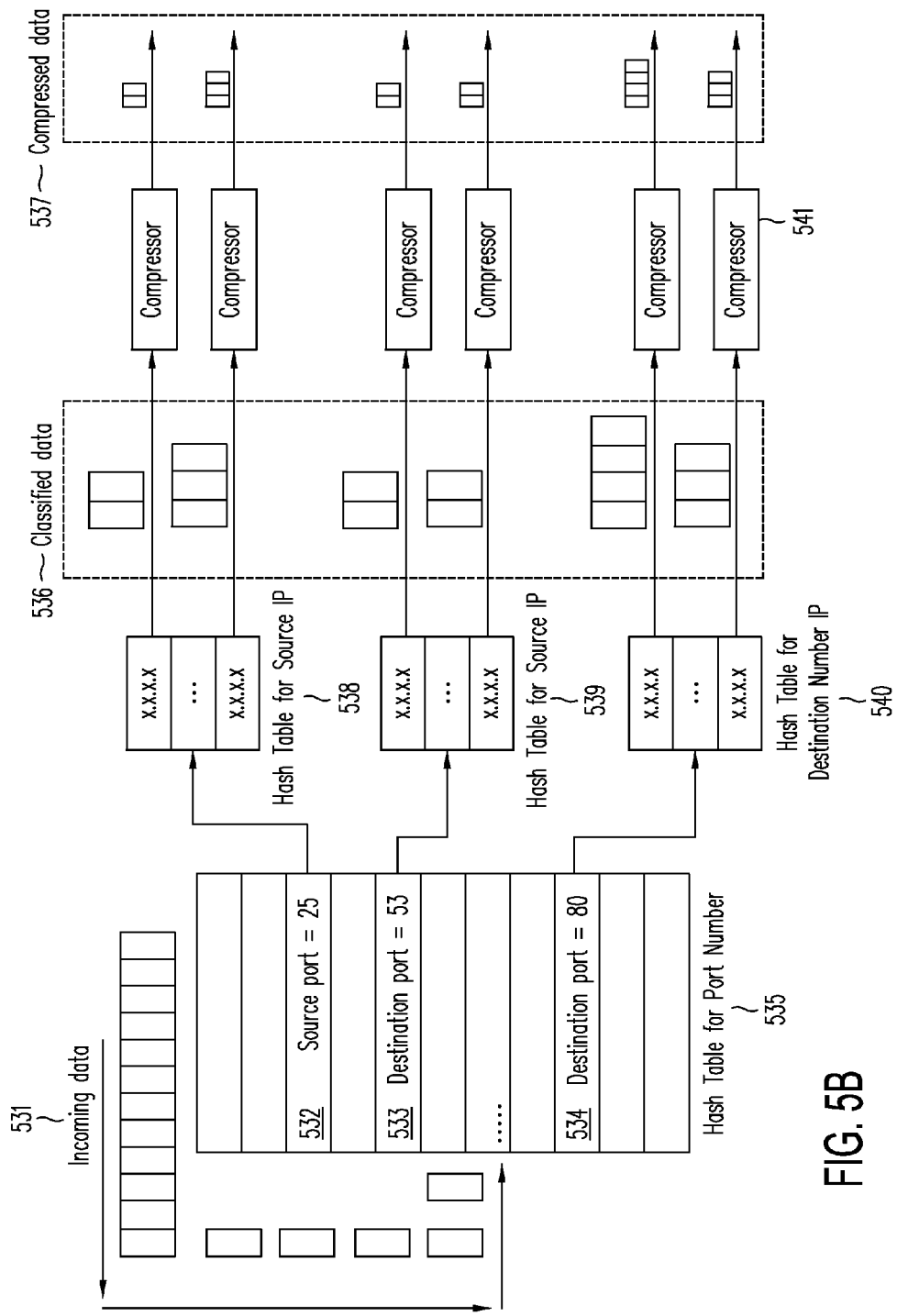
FIG. 5B shows a schematic diagram of a data compression flow based on a compression plan generated from an exemplary classification tree according to aspects of the invention.

FIG. 5B shows a schematic diagram of a data compression flow based on a compression plan generated from an exemplary classification tree depicting an example of the payloads being compressed in an online compression case. As described above and shown in FIG. 5C, two layer hash tables (e.g., (535), (538), (539), (540), etc.) may be constructed from the top 2 layers of a classification tree for generating classified data (536). In many examples, almost all the top layer classification is based on either on destination port (e.g., (533), (534), etc.) or source port (e.g., (532)) since many existing applications use fixed port numbers. The second layer may be any other remaining fields depends on the port number used in the first layer. Any incoming payload data (531) is hashed to find respective compressors (e.g., (541), etc.) by the values in corresponding fields. As a result, the compressors work at very high speed to generate compressed data (537) since the overhead added to compression is only two constant hash operations.

Figure 6:
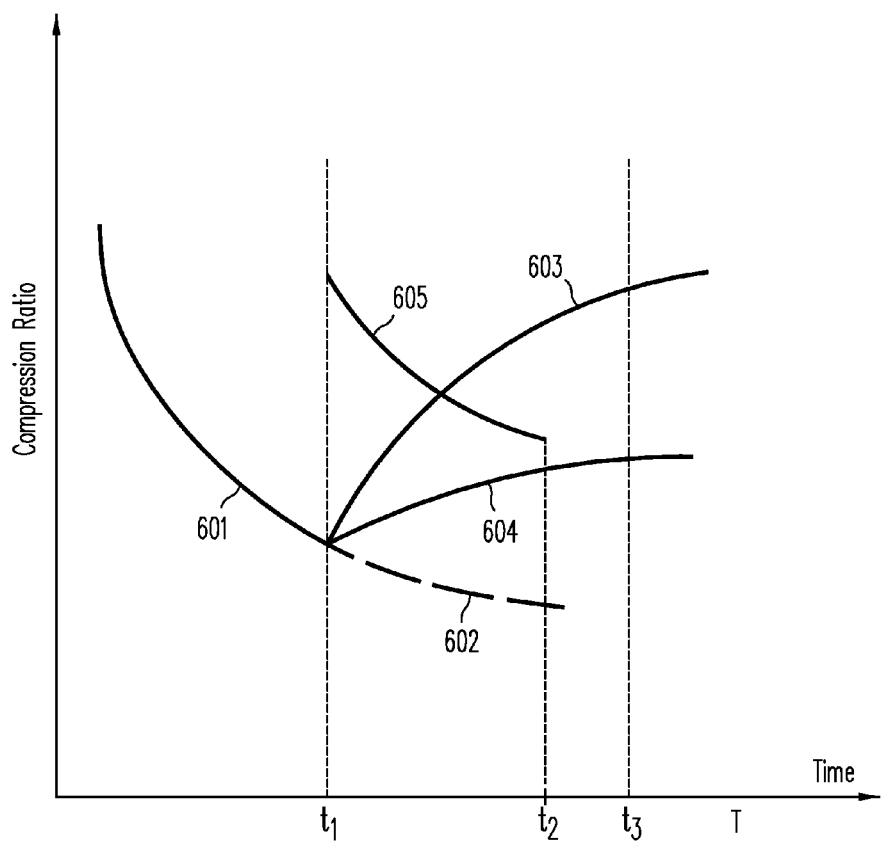
FIG. 6 shows an exemplary cumulative compression ratio plot depicting traffic pattern change detection according to aspects of the invention.

FIG. 6 shows an exemplary cumulative compression ratio plot depicting traffic pattern change detection according to aspects of the invention. The exemplary compression algorithm IPzip exploits the inner structure of the data stream in detail to determined the compression plan. Internet traffic is highly dynamic and thus IPzip will be required to track its performance over time such as to switch to a more efficient plan as time requires.

FIG. 6 presents a basic example that shows the evolution of the observed compression ratio over time. In this example, the traffic conditions is assumed to be stable for a window time of, for example less than 1 hour.

Let's assume that the amount of the original traffic at time t on a generic link is Ct, where C is a constant decided by the rate of the link under consideration. Let's assume that f(t) is a generic function that captures the properties of the compression algorithm (e.g., Gzip). Hence the data compressed at any point in time is f(t)Ct. If the traffic pattern is stable, then f(t) is a monotonically decreasing function for a compressor that is asymptotical optimal when the data size is infinitively large. Let's assume that at time $t_1$ IPzip observes the compression ratio, denoted as $f_o$ (solid line (601) and (604)) to diverge (603) from its expected value (dashed line (602)). The change in the traffic pattern can be easily detected by using simple predictors such as ARMA model known in the art. At this time, IPzip started the learning phase of the new plan, denoted as $f_n$. Let's assume that IPzip is ready to determine the new plan $f_n$ at time $t_2$. The problem is reduce to determine the time $t_3$ for IPzip to switch to the new plan to achieve an optimal compression ratio (604). The optimal value of $t_3$ can be found by solving the following differential equation $$\frac{\partial S(T, t_s)}{\partial t_3} = 0,$$

where $S(T,t_3)=f_o(t_3)Ct+f_n(T-t_3)C(T-t_3)$ Notice that parameter T can either represent the end of the collection time or, more generally, the time at which a new change in the traffic pattern is expected. Such a parameter can either be captured by looking at diurnal or seasonal trends characteristic of Internet traffic, or calculated more rigorously using time series models.

Figure 7:
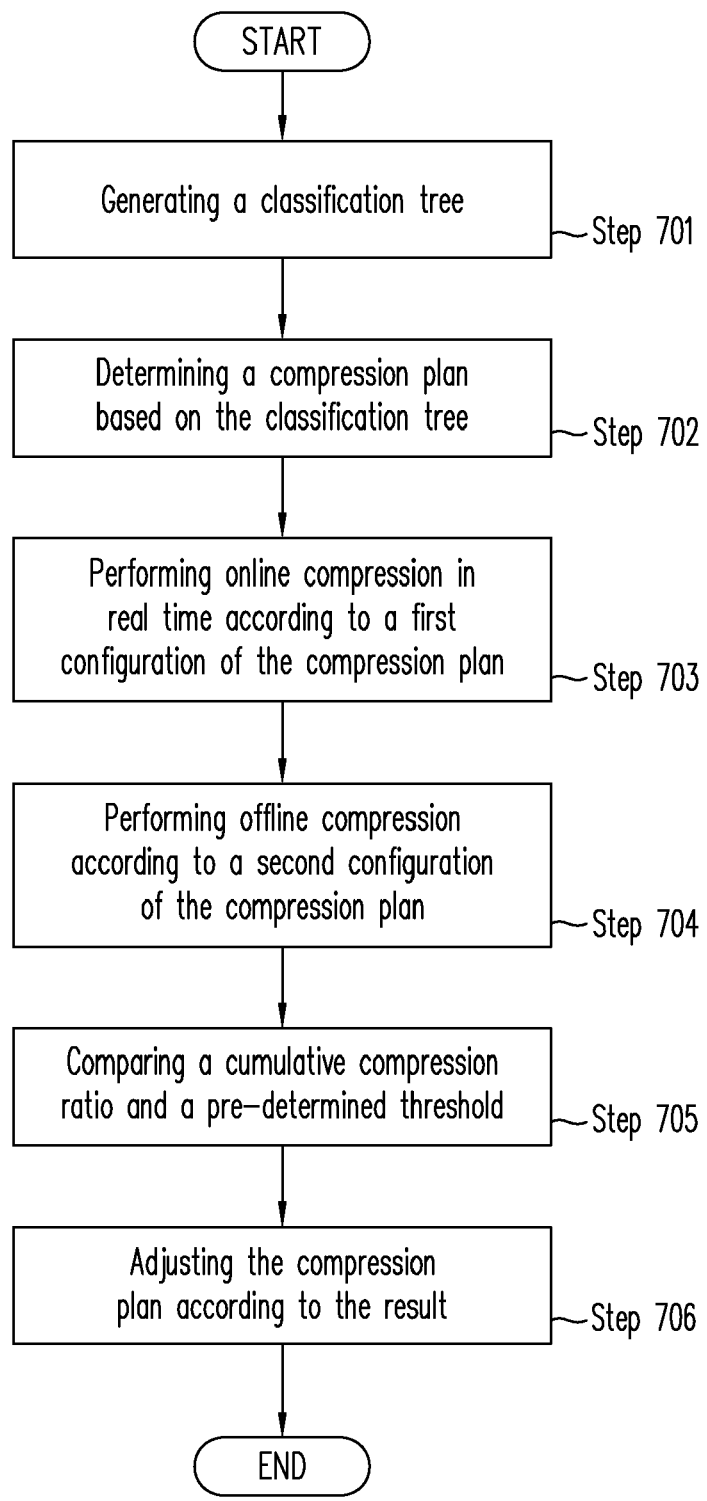
FIG. 7 shows a flow chart of a method according to aspects of the invention.

FIG. 7 shows a flow chart of a method according to aspects of the invention. The method relates to data compressing in a network where the data comprises packets having a header and a payload. The header generally has multiple header fields. Initially, a classification tree is generated based on at least a portion of the header fields, for example as described with respect to FIGS. 4A and 4B above (step 701). A compression plan is then determined based on the classification tree, for example as described with respect to FIG. 3 above (step 702). Online compression may then be performed in real time (e.g., for data transferred by a network node) to a first configuration of the compression plan (step 703). An example is described with respect to FIGS. 5A and 5B above. Furthermore, offline compression may be performed (e.g., for data collected by a data repository of the network) according to a second configuration of the compression plan (step 704). A cumulative compression ratio may be monitored and compared to a pre-determined threshold, for example as described with respect to FIG. 6 above (step 705). The compression plan may then be adjusted according to the result, for example as described with respect to FIG. 6 above (step 705).

It will be understood from the foregoing description that various modifications and changes may be made in the preferred and alternative embodiments of the present invention without departing from its true spirit. For example, although the examples given above relates to a TCP/IP or an OSI network data model, the invention may be applied to other network data model known to one skilled in the art. Furthermore, the classification tree, Gzip compression algorithm, the training data set, the layer-3/layer-4 header information, the compression time window, the cumulative compression ratio threshold, etc. may be supplemented by variations of the examples described or include subset or superset of the examples given above, the method may be performed in a different sequence, the components provided may be integrated or separate, the devices included herein may be manually and/or automatically activated to perform the desired operation. The activation (e.g., performing training, online compression, offline compression, compression plan modification, etc.) may be performed as desired and/or based on data generated, conditions detected and/or analysis of results from the network traffic.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of compressing data in a network, the data comprising a plurality of packets corresponding to a plurality of headers and a plurality of payloads, a packet of the plurality of packets having a header of the plurality of headers and a payload of the plurality of payloads, each of the plurality of headers comprising a plurality of header fields, the method comprising:

generating, using a computer, a matrix based on the plurality of packets, the matrix comprising a plurality of rows each corresponding to one of the plurality of packets and a plurality of structured columns each corresponding to one of the plurality of header fields, the matrix further comprising an unstructured column having a plurality of row elements each comprising one of the plurality of payloads;

determining, using the computer, an intra-packet compression plan based on historical network data, the intra-packet compression plan configured to reorder and divide the plurality of structured columns in the matrix into a plurality of groups;

determining, using the computer, an inter-packet compression plan based on historical network data, the inter-packet compression plan configured to reorder and classify the plurality of rows in the matrix based on a plurality of hierarchical categories in a classification tree determined using the historical network data, wherein the classification tree is determined by:

composing a full classification tree having a plurality of nodes based on the plurality of header fields, each of the plurality of nodes representing payload classification based on a specific value combination of the plurality of header fields;

identifying a hierarchical category of the plurality of hierarchical categories from the full classification tree, the hierarchical category comprising one or more nodes in the plurality of nodes identified based on minimizing a first cost function while applying the inter-packet compression plan to the historical network data; and including the hierarchical category in the classification tree; and performing, using the computer, inter-packet compression of the plurality of payloads based on the inter-packet compression plan; and performing, using the computer, intra-packet compression of the plurality of headers based on the intra-packet compression plan.

2. The method of claim 1, further comprising:

obtaining the plurality of packets in real time in a compression phase subsequent to determining the intra-packet compression plan and the inter-packet compression plan based on the historical network data during a training phase, wherein the intra-packet compression plan is determined during the training phase based on minimizing a second cost function while applying the intra-packet compression plan to the historical network data, wherein performing the intra-packet compression comprises performing first online compression in real time for the plurality of headers using a plurality of header compressors corresponding to the plurality of groups, wherein the first online compression is performed concurrently for each of the plurality of groups using a corresponding one of the plurality of header compressors, wherein performing the inter-packet compression comprises performing second online compression in real time for the plurality of payloads using a plurality of payload compressors corresponding to a portion of the plurality of hierarchical categories based on a top portion of the classification tree, wherein the second online compression is performed concurrently for each hierarchical category in the portion of the plurality of hierarchical categories using a corresponding one of the plurality of payload compressors.

3. A non-transitory computer readable medium, embodying instructions executable by the computer to perform method steps for compressing data in a network, the data comprising a plurality of packets corresponding to a plurality of headers and a plurality of payloads, a packet of the plurality of packets having a header of the plurality of headers and a payload of the plurality of payloads, each of the plurality of headers comprising a plurality of header fields, the instructions comprising functionality for:

generating, a matrix based on the plurality of packets, the matrix comprising a plurality of rows each corresponding to one of the plurality of packets and a plurality of structured columns each corresponding to one of the plurality of header fields;

determining an intra-packet compression plan based on historical network data, the intra-packet compression plan configured to reorder and divide the plurality of structured columns in the matrix into a plurality of groups, determining an inter-packet compression plan based on historical network data, the inter-packet compression plan configured to reorder and classify the plurality of rows in the matrix based on a plurality of hierarchical categories in a classification tree determined using the historical network data, wherein the classification tree is determined by:

composing a full classification tree having a plurality of nodes based on the plurality of header fields, each of the plurality of nodes representing payload classification based on a specific value combination of the plurality of header fields;

identifying a hierarchical category of the plurality of hierarchical categories from the full classification tree, the hierarchical category comprising one or more nodes in the plurality of nodes identified based on minimizing a first cost function while applying the inter-packet compression plan to the historical network data; and including the hierarchical category in the classification tree; and performing inter-packet compression of the plurality of payloads based on the inter-packet compression plan; and performing, intra-packet compression of the plurality of headers based on the intra-packet compression plan.

4. The method of claim 2, further comprising:
performing at least one selected from a group consisting of the intra-packet compression and the inter-packet compression of the plurality of packets while the plurality of packets are being transferred by a network node of the network.

5. The method of claim 2, further comprising:
performing at least one selected from a group consisting of the intra-packet compression and the inter-packet compression of the plurality of packets subsequent to the plurality of packets being collected by a data repository of the network.

6. The method of claim 2, further comprising:
comparing a cumulative compression ratio and a pre-determined threshold to generate a result, wherein the cumulative compression ratio is based on cumulatively performing at least one selected from a group consisting of the intra-packet compression and the inter-packet compression subsequent to the training phase; and
adjusting at least one selected from a group consisting of the intra-packet compression plan and the inter-packet compression plan to generate an adjusted compression plan according to the result.

7. The method of claim 6, wherein the pre-determined threshold is a function of time period subsequent to the training phase.

8. The method of claim 6,
wherein adjusting at least one selected from a group consisting of the intra-packet compression plan and the inter-packet compression plan comprises adjusting the classification tree.

9. The method of claim 6, further comprising:
determining an optimal time to replace at least one selected from a group consisting of the intra-packet compression plan and the inter-packet compression plan by the adjusted compression plan.

10. The non-transitory computer readable medium of claim 3, the instructions further comprising functionality for:
obtaining the plurality of packets in real time in a compression phase subsequent to determining the intra-packet compression plan and the inter-packet compression plan based on the historical network data during a training phase, wherein the intra-packet compression plan is determined during the training phase based on minimizing a second cost function while applying the intra-packet compression plan to the historical network data, wherein performing the intra-packet compression comprises performing first online compression in real time for the plurality of headers using a plurality of header compressors corresponding to the plurality of groups, wherein the first online compression is performed concurrently for each of the plurality of groups using a corresponding one of the plurality of header compressors, wherein performing the inter-packet compression comprises performing second online compression in real time for the plurality of payloads using a plurality of payload compressors corresponding to a portion of the plurality of hierarchical categories based on a top portion of the classification tree, wherein the second online compression is performed concurrently for each hierarchical category in the portion of the plurality of hierarchical categories using a corresponding one of the plurality of payload compressors.

11. The non-transitory computer readable medium of claim 10, the instructions further comprising functionality for:
performing at least one selected from a group consisting of the intra-packet compression and the inter-packet compression of the plurality of packets while the plurality of packets are being transferred by a network node of the network.

12. The non-transitory computer readable medium of claim 10, the instructions further comprising functionality for:
performing at least one selected from a group consisting of the intra-packet compression and the inter-packet compression of the plurality of packets subsequent to the plurality of packets being collected by a data repository of the network.

13. The non-transitory computer readable medium of claim 10, the instructions further comprising functionality for:
comparing a cumulative compression ratio and a pre-determined threshold to generate a result, wherein the cumulative compression ratio is based on cumulatively performing at least one selected from a group consisting of the intra-packet compression and the inter-packet compression subsequent to the training phase; and
adjusting at least one selected from a group consisting of the intra-packet compression plan and the inter-packet compression plan to generate an adjusted compression plan according to the result.

14. The non-transitory computer readable medium of claim 13, wherein the predetermined threshold is a function of time period subsequent to the training phase.

15. The non-transitory computer readable medium of claim 13, wherein adjusting at least one selected from a group consisting of the intra-packet compression plan and the inter-packet compression plan comprises adjusting the classification tree.

16. The non-transitory computer readable medium of claim 13, the instructions further comprising functionality for:
determining an optimal time to replace at least one selected from a group consisting of the intra-packet compression plan and the inter-packet compression plan by the adjusted compression plan.

* * * * *